United States Patent
Ionescu (10) Patent No.: US 11,340,890 B2
(45) Date of Patent: May 24, 2022

(54) INTEGRITY ASSURANCE AND REBOOTLESS UPDATING DURING RUNTIME

(71) Applicant: CrowdStrike, Inc., Irvine, CA (US)

(72) Inventor: Ion-Alexandru Ionescu, Seattle, WA (US)

(73) Assignee: CrowdStrike, Inc., Irvine, CA (US)

(*) Notice: Subject to any disclaimer, the term of this patent is extended or adjusted under 35 U.S.C. 154(b) by 0 days.

(21) Appl. No.: 16/408,180

(22) Filed: May 9, 2019

(65) Prior Publication Data

US 2019/0265968 A1 Aug. 29, 2019

Related U.S. Application Data

(62) Division of application No. 14/220,362, filed on Mar. 20, 2014, now Pat. No. 10,289,405.

(51) Int. Cl.
*G06F 9/455* (2018.01)
*G06F 8/656* (2018.01)
(Continued)

(52) U.S. Cl.
CPC ............ *G06F 8/656* (2018.02); *G06F 21/566* (2013.01); *G06F 21/568* (2013.01); *H04L 67/34* (2013.01)

(58) Field of Classification Search
CPC ...... G06F 8/656; G06F 21/566; G06F 21/568; H04L 67/34
See application file for complete search history.

(56) References Cited

U.S. PATENT DOCUMENTS

| 5,355,498 A | 10/1994 | Provino et al. |
| 6,009,274 A | 12/1999 | Fletcher et al. |

(Continued)

FOREIGN PATENT DOCUMENTS

| EP | 0648353 | 4/1995 |
| JP | 2003084983 | 3/2003 |

(Continued)

OTHER PUBLICATIONS

Australian Office Action dated Jan. 22, 2018 for Australian Patent Application No. 2013272198, a counterpart foreign application of U.S. Pat. No. 9,043,903, 5 pages.

(Continued)

*Primary Examiner* — Hang Pan
(74) *Attorney, Agent, or Firm* — Lee & Hayes, P.C.

(57) ABSTRACT

Techniques are described herein for, without rebooting a computing device, unloading at least a component of a kernel-mode component of the computing device and loading an updated version of the component of the kernel-mode component. The techniques may be performed by an integrity manager associated with the kernel-mode component. The integrity manager may also determine integrity of the kernel-mode component by causing the kernel-mode component to perform an action associated with a known reaction, determining whether the known reaction occurred, and in response, performing a remediation action or notifying a remote security service. Further, the integrity manager may determine whether any computing device lists include representations of components or connections associated with the kernel-mode component. The integrity manager may then remove the representations from the lists or remove the representations from responses to requests for contents of the computing device lists.

20 Claims, 5 Drawing Sheets

(51) Int. Cl.
    *G06F 21/56*    (2013.01)
    *H04L 67/00*    (2022.01)

(56)     References Cited

U.S. PATENT DOCUMENTS

| | | |
|---|---|---|
| 6,052,723 A | 4/2000 | Ginn |
| 6,088,804 A | 7/2000 | Hill et al. |
| 6,463,584 B1 | 10/2002 | Gard et al. |
| 7,093,116 B2 | 8/2006 | Chen et al. |
| 7,099,948 B2 | 8/2006 | Tormasov et al. |
| 7,281,268 B2 | 10/2007 | Hollander et al. |
| 7,366,891 B2 | 4/2008 | Khanna et al. |
| 7,441,113 B2 | 10/2008 | Chong et al. |
| 7,448,049 B1 | 11/2008 | Xing |
| 7,478,237 B2 | 1/2009 | Costea et al. |
| 7,512,810 B1 | 3/2009 | Ryan |
| 7,571,448 B1 | 8/2009 | Sallam |
| 7,765,400 B2 | 7/2010 | Costea et al. |
| 7,765,410 B2 | 7/2010 | Costea et al. |
| 7,890,664 B1 | 2/2011 | Tao et al. |
| 7,908,656 B1* | 3/2011 | Mu .............. G06F 21/6218 |
| | | 726/22 |
| 8,065,728 B2 | 11/2011 | Wang et al. |
| 8,086,836 B2 | 12/2011 | Chong et al. |
| 8,190,868 B2 | 5/2012 | Schneider |
| 8,220,041 B2 | 7/2012 | Boyce |
| 8,234,693 B2 | 7/2012 | Stahl et al. |
| 8,239,947 B1 | 8/2012 | Glick et al. |
| 8,321,677 B2 | 11/2012 | Morten |
| 8,407,279 B2 | 3/2013 | Kang |
| 8,407,698 B2 | 3/2013 | Lee |
| 8,413,261 B2 | 4/2013 | Nemoy et al. |
| 8,429,429 B1 | 4/2013 | Kargman et al. |
| 8,510,570 B2 | 8/2013 | Smith et al. |
| 8,533,830 B1 | 9/2013 | Dalcher |
| 8,539,584 B2 | 9/2013 | Ramalingam |
| 8,549,648 B2 | 10/2013 | Sallam |
| 8,572,247 B2 | 10/2013 | Larson et al. |
| 8,572,733 B1 | 10/2013 | Rockwood |
| 8,577,616 B2 | 11/2013 | Dunlap |
| 8,578,477 B1 | 11/2013 | Lin et al. |
| 8,607,340 B2 | 12/2013 | Wright |
| 8,631,488 B2 | 1/2014 | Oz et al. |
| 8,762,298 B1 | 6/2014 | Ranjan et al. |
| 8,776,218 B2 | 7/2014 | Wright |
| 8,776,227 B1 | 7/2014 | Glick et al. |
| 8,789,034 B1 | 7/2014 | Emelyanov et al. |
| 9,038,176 B2 | 5/2015 | Sallam |
| 9,043,903 B2 | 5/2015 | Diehl et al. |
| 9,158,914 B2 | 10/2015 | Ionescu |
| 9,317,687 B2 | 4/2016 | Edwards et al. |
| 9,571,453 B2 | 2/2017 | Diehl et al. |
| 9,606,809 B2 | 3/2017 | Zhang |
| 9,621,515 B2 | 4/2017 | Diehl et al. |
| 10,002,250 B2 | 6/2018 | Diehl et al. |
| 10,339,322 B2 | 7/2019 | Kim et al. |
| 10,476,904 B2 | 11/2019 | Yamada et al. |
| 10,503,904 B1 | 12/2019 | Singh et al. |
| 2001/0044904 A1 | 11/2001 | Berg et al. |
| 2002/0023211 A1 | 2/2002 | Roth et al. |
| 2003/0112781 A1 | 6/2003 | Kermode et al. |
| 2004/0107416 A1 | 6/2004 | Buban et al. |
| 2004/0153724 A1* | 8/2004 | Nicholson ........... G06F 11/0709 |
| | | 714/6.11 |
| 2004/0255153 A1* | 12/2004 | Huynh .................. G06F 21/554 |
| | | 726/23 |
| 2005/0097562 A1* | 5/2005 | Kelley ................. G06F 9/44521 |
| | | 719/310 |
| 2005/0159998 A1 | 7/2005 | Buyukkokten et al. |
| 2005/0268136 A1* | 12/2005 | Kostadinov ............. G06F 9/542 |
| | | 713/400 |
| 2006/0156380 A1 | 7/2006 | Gladstone et al. |
| 2006/0174323 A1 | 8/2006 | Brown et al. |
| 2007/0022287 A1 | 1/2007 | Beck et al. |
| 2007/0094496 A1 | 4/2007 | Burtscher |
| 2007/0143850 A1 | 6/2007 | Kraemer et al. |
| 2007/0153993 A1* | 7/2007 | Cohen .................. H04M 11/002 |
| | | 379/100.05 |
| 2007/0250817 A1 | 10/2007 | Boney |
| 2008/0034429 A1* | 2/2008 | Schneider ............. G06F 21/566 |
| | | 726/23 |
| 2008/0126806 A1 | 5/2008 | Morten |
| 2008/0162589 A1* | 7/2008 | Rodeheffer ......... G06F 11/1469 |
| 2008/0189796 A1 | 8/2008 | Linn et al. |
| 2008/0209505 A1 | 8/2008 | Ghai et al. |
| 2008/0253287 A1 | 10/2008 | Gupta et al. |
| 2008/0282198 A1 | 11/2008 | Brooks et al. |
| 2008/0301669 A1 | 12/2008 | Rao et al. |
| 2009/0070878 A1 | 3/2009 | Wang et al. |
| 2009/0094039 A1 | 4/2009 | MacDonald et al. |
| 2009/0119681 A1 | 5/2009 | Bhogal et al. |
| 2009/0216806 A1 | 8/2009 | Feuerstein et al. |
| 2009/0288165 A1 | 11/2009 | Qiu et al. |
| 2009/0307142 A1 | 12/2009 | Mardikar |
| 2010/0074446 A1 | 3/2010 | Fuchs et al. |
| 2010/0169973 A1 | 7/2010 | Kim et al. |
| 2010/0212012 A1 | 8/2010 | Touboul et al. |
| 2010/0235622 A1 | 9/2010 | Robinton et al. |
| 2010/0235879 A1 | 9/2010 | Burnside et al. |
| 2010/0312890 A1 | 12/2010 | Bernosky |
| 2011/0010522 A1 | 1/2011 | Abts et al. |
| 2011/0029772 A1 | 2/2011 | Fanton et al. |
| 2011/0099632 A1 | 4/2011 | Beck et al. |
| 2011/0145598 A1 | 6/2011 | Smith et al. |
| 2011/0167494 A1 | 7/2011 | Bowen et al. |
| 2011/0209219 A1 | 8/2011 | Zeitlin et al. |
| 2011/0239306 A1 | 9/2011 | Avni et al. |
| 2012/0005542 A1 | 1/2012 | Petersen et al. |
| 2012/0079594 A1 | 3/2012 | Jeong et al. |
| 2012/0084799 A1 | 4/2012 | Sallam |
| 2012/0167161 A1 | 6/2012 | Kim |
| 2012/0246297 A1 | 9/2012 | Shanker et al. |
| 2012/0255002 A1 | 10/2012 | Sallam |
| 2012/0255012 A1 | 10/2012 | Sallam |
| 2013/0145465 A1 | 6/2013 | Wang et al. |
| 2013/0291112 A1 | 10/2013 | Shue et al. |
| 2013/0305340 A1 | 11/2013 | Wotring |
| 2013/0312095 A1 | 11/2013 | Edwards et al. |
| 2013/0312099 A1* | 11/2013 | Edwards ............... G06F 21/554 |
| | | 726/24 |
| 2013/0333040 A1 | 12/2013 | Diehl et al. |
| 2014/0007190 A1 | 1/2014 | Alperovitch et al. |
| 2014/0109226 A1 | 4/2014 | Diehl et al. |
| 2014/0317405 A1 | 10/2014 | Johnson et al. |
| 2015/0007316 A1 | 1/2015 | Ben-Shalom et al. |
| 2015/0007331 A1 | 1/2015 | Pfeifer, Jr. et al. |
| 2015/0101044 A1 | 4/2015 | Martin et al. |
| 2015/0128206 A1 | 5/2015 | Ben Haim et al. |
| 2015/0178071 A1 | 6/2015 | Pavlik et al. |
| 2015/0244679 A1 | 8/2015 | Diehl et al. |
| 2015/0256552 A1 | 9/2015 | Lee et al. |
| 2015/0326614 A1 | 11/2015 | Alperovitch et al. |
| 2015/0356301 A1 | 12/2015 | Diehl et al. |
| 2016/0170740 A1 | 6/2016 | Ionescu |
| 2017/0061127 A1 | 3/2017 | Ionescu |
| 2017/0109530 A1 | 4/2017 | Diehl et al. |
| 2017/0213031 A1 | 7/2017 | Diehl et al. |
| 2017/0279614 A1 | 9/2017 | Mercury et al. |
| 2020/0026855 A1 | 1/2020 | Moyal et al. |

FOREIGN PATENT DOCUMENTS

| | | |
|---|---|---|
| JP | 2006065835 | 3/2006 |
| JP | 2006134307 | 5/2006 |
| JP | 2008047123 | 2/2008 |
| JP | 2008507757 | 3/2008 |
| JP | 2008084304 | 4/2008 |
| JP | 2009015428 | 1/2009 |
| JP | 2009238153 | 10/2009 |
| JP | 2010517164 | 5/2010 |
| JP | 2010182019 | 8/2010 |
| JP | 2013502005 | 1/2013 |
| KR | 1020100085424 A | 7/2010 |
| KR | 101038048 | 6/2011 |

(56) References Cited

FOREIGN PATENT DOCUMENTS

| WO | WO2006023685 | 3/2006 |
|---|---|---|
| WO | WO2012107557 | 8/2012 |
| WO | WO2012135192 | 10/2012 |
| WO | WO2013164821 | 11/2013 |
| WO | WO2013184281 | 12/2013 |

OTHER PUBLICATIONS

Australian Office Action dated Nov. 30, 2017 for Australian patent application No. 2013281175, a counterpart foreign application of U.S. Pat. No. 9,292,881, 4 pages.
Chiueh, et al., "Stealthy Deployment and Execution of In-Guest Kernel Agents", The Black Hat Technical Security Conference USA, 2009, pp. #1-pp. #12.
European Office Action dated Nov. 22, 2017 for European patent application No. 13800519.4, a counterpart foreign application of U.S. Pat. No. 9,043,903, 7 pgaes.
European Office Action dated Aug. 7, 2018, for European patent application No. 13808592.3, a counterpart foreign application of U.S. Pat. No. 9,292,881, 6 pgaes.
European Office Action dated Sep. 11, 2017 for European Patent Application No. 16179598.4, a counterpart foreign application of U.S. Appl. No. 14/810,840, 4 pages.
Extended European Search Report dated Jan. 22, 2018 for European Patent Application No. 15764091.3, 11 pages.
Partial Supplementary European Search Report dated Jan. 25, 2016 for European Patent Application No. 13808592.3, 6 pages.
Partial Supplementary European Search Report dated Oct. 12, 2017 for European Patent Application No. 15764091.3, 13 pages.
Supplementary European Search Report dated Nov. 3, 2015 for European Patent Application No. 13800519.4, 7 pages.
Extended European Search Report dated Dec. 6, 2016 for European patent application No. 16179598.4, 7 pages.
Supplementary Extended European Search Report dated Feb. 16, 2016 for European patent application No. 1380051934, 22 pages.
Extended European Search Report dated Jun. 15, 2018 for European Patent Application No. 18157955.8, 10 pages.
Extended European Search Report dated Jun. 2, 2016 for European patent application No. 13808592.3, 12 pages.
Graf, "Netlink Library (libnl)", retrieved on Jun. 5, 2018 at <<https://www.infradead.org/~tgr/libnl/doc/core.html>>, May 9, 2011, 63 pages.
IDG Communications, "Symantec adds New Protection Features to Its Conusmer and Enterprise Antivirus Solutions", Jan. 19, 2006, 5 pages.
Israeli Office Action dated Aug. 30, 2017 for Israeli patent application No. 235905, a counterpart foreign application of U.S. Pat. No. 9,043,903, 5 pages.
Israeli Office Action dated Sep. 11, 2017 for Israeli patent application No. 236390, a counterpart foreign application of U.S. Pat. No. 9,292,881, 7 pages.
Japanese Office Action dated Jan. 8, 2019 for Japanese Patent Application No. 2017-177787, a counterpart of U.S. Pat. No. 9,043,903, 7 pages.
Japanese Office Action dated Jan. 29, 2019 for Japanese Patent Application No. 2016-557973, a counterpart of U.S. Appl. No. 14/220,362, 7 pages.
Japanese Office Action dated Feb. 20, 2018 for Japanese Patent Application No. 2015-520185, a counterpart foreign application of U.S. Pat. No. 9,292,881, 9 pages.
Japanese Office Action dated Mar. 21, 2017 for Japanese patent application No. 2015-520185, a counterpart foreign application of U.S. Pat. No. 9,292,881, 11 pages.
Japanese Office Action dated Apr. 25, 2017 for Japanese Patent Application No. 2015-516024, a counterpart foreign application of U.S. Pat. No. 9,043,903, 22 pages.

Kaichuan, "Kernel Korner—Why and How to Use Netlink Socket", retrieved on Jun. 5, 2018 at <<https://www.linuxjournal.com/article/7356>>, Jan. 5, 2015, pp. 1-13.
King et al., "Backtracking Intrusions", ACM SOSP, Oct. 2003, vol. 37, Issue 5, 14 pgs.
Messmer, "Are all rootkits evil? Settlement in Sony CD case resurrects old debate.", retrieved on Aug. 11, 2018 from https://www.networld.com/article/2312244/lan-wan/are-all-rootkits-evil.html, May 23, 2006, 4 pages.
Neira-Ayuso, et al., "Communicating between the kernel and user-space in Linux using Netlink sockets", Software—Practice and Experience, vol. 40, No. 9, Aug. 1, 2010, Wiley Interscience, pp. 797-810.
Final Office Action dated Jan. 18, 2019 for U.S. Appl. No. 15/051,461 "Integrity Assurance and Rebootless Updating During Runtime" Ionescu, 9 pages.
Final Office Action for U.S. Appl. No. 13/492,672, dated Oct. 23, 2014, David F. Diehl, "Kernel-Level Security Agent", 15 pages.
Office action for U.S. Appl. No. 15/393,797, dated Oct. 30, 2017, Diehl et al., "Security Agent", 10 pages.
Office Action for U.S. Appl. No. 15/438,553, dated Nov. 1, 2018, Petrbok et al., "Symmetric Bridge Component for Communications Between Kernel Mode and User Mode", 17 pages.
Office Action for U.S. Appl. No. 15/051,461, dated Nov. 15, 2017, Ionescu, "Integrity Assurance and Rebootless Updating During Runtime", 9 pages.
Office Action for U.S. Appl. No. 14/810,840, dated Nov. 3, 2017, Ionescu, "Integrity Assurance Through Early Loading in the Boot Phase", 16 pages.
Office action for U.S. Appl. No. 14/220,362, dated Nov. 7, 2017, Ionescu, "Integrity Assurance and Rebootless Updating During Runtime", 16 pages.
Office action for U.S. Appl. No. 14/792,177, dated Dec. 16, 2016, Alperovitch et al., "Social Sharing of Security Information in a Group", 12 pages.
Final Office Action for U.S. Appl. No. 13/538,439, dated Dec. 2, 2014, Dmitri Alperovitch, "Social Sharing of Security Information in a Group", 13 pages.
Final Office Action for U.S. Appl. No. 13/728,746, dated Dec. 3, 2014, David F. Diehl, "Real-Time Representation of Security-Relevant System State", 22 pages.
Office action for U.S. Appl. No. 15/051,461, dated Dec. 8, 2016, Ionescu, "Integrity Assurance and Rebootless Updating During Runtime", 9 pages.
Office action for U.S. Appl. No. 14/709,779, dated Feb. 23, 2016, Diehl et al., "Kernel-Level Security Agent", 14 pages.
Office action for U.S. Appl. No. 14/220,362, dated Feb. 7, 2017, Ionescu, "Integrity Assurance and Rebootless Updating During Runtime", 16 pages.
Office action for U.S. Appl. No. 15/051,461, dated Mar. 15, 2018, Ionescu, "Integrity Assurance and Rebootless Updating During Runtime", 12 pages.
Office Action for U.S. Appl. No. 13/728,746, dated Apr. 14, 2014, David F. Diehl, "Real-Time Representation of Security-Relevant System State", 17 pages.
Office action for U.S. Appl. No. 15/393,797, dated Apr. 18, 2017, Diehl et al., "Security Agent", 15 pages.
Office Action for U.S. Appl. No. 14/810,840, dated Apr. 20, 2017, Ionescu, "Integrity Assurance Through Early Loading in the Boot Phase", 12 pages.
Office Action for U.S. Appl. No. 13/538,439, dated Apr. 23, 2015, Dmitri Alperovitch, "Social Sharing of Security Information in a Group", 6 pages.
Office Action for U.S. Appl. No. 13/492,672, dated Apr. 7, 2014, David F. Diehl, "Kernel-Level Security Agent", 3 pages.
Office action for U.S. Appl. No. 14/140,323, dated May 11, 2016, Diehl et al., "Kernel-Level Security Agent", 15 pages.
Office action for U.S. Appl. No. 14/220,362, dated May 25, 2016, Ionescu, "Integrity Assurance and Rebootless Updating During Runtime", 12 pages.
Office action for U.S. Appl. No. 15/051,461, dated Jun. 1, 2017, Ionescu, "Integrity Assurance and Rebootless Updating During Runtime", 11 pages.

(56) References Cited

OTHER PUBLICATIONS

Office action for U.S. Appl. No. 14/792,177, dated Jun. 15, 2017, Alperovitch et al., "Social Sharing of Security Information in a Group", 14 pages.
European Office Action dated Jul. 5, 2019 for European Patent Application No. 13808592.3, a counterpart of U.S. Pat. No. 9,292,881, 5 pages.
Office Action for U.S. Appl. No. 15/483,153, dated Jun. 29, 2017, Diehl et al., "Kernel-Level Security Agent", 12 pages.
Office action for U.S. Appl. No. 13/538,439, dated Jun. 30, 2014, Alperovitch et al., "Social Sharing of Security Information in a Group", 13 pages.
Office action for U.S. Appl. No. 14/792,177, dated Jun. 30, 2016, Alperovitch et al., "Social Sharing of Security Information in a Group", 11 pages.
Office Action for U.S. Appl. No. 14/140,323, dated Jul. 31, 2015, David F. Diehl, "Kernel-Level Security Agent", 9 pages.
Office action for U.S. Appl. No. 14/709,779, dated Aug. 12, 2016, Diehl et al., "Kernel-Level Security Agent", 7 pages.
Office action for U.S. Appl. No. 15/051,461, dated Aug. 16, 2018, Ionescu, "Integrity Assurance and Rebootless Updating During Runtime", 11 pages.
Office action for U.S. Appl. No. 14/220,362, dated Aug. 23, 2018, Ionescu, "Integrity Assurance and Rebootless Updating During Runtime", 14 pages.
Office action for U.S. Appl. No. 14/220,362, dated Sep. 16, 2016, Ionescu, "Integrity Assurance and Rebootless Updating During Runtime", 14 pages.
PCT Search Report and Written Opinion dated Apr. 28, 2015 for PCT application No. PCT/US2015/013522, 13 pages.
PCT Search Report and Written Opinion dated Apr. 29, 2014 for PCT application No. PCT/US13/75856, 13 pages.
PCT Search Report and Written Opinion dated Jun. 1, 2015 for PCT application No. PCT/US2015/020187, 13 pages.
PCT Search Report and Written Opinion dated Sep. 17, 2013 for PCT application No. PCT/US2013/040420, 12 pages.
PCT Search Report and Written Opinion dated Sep. 26, 2013 for PCT Application No. PCT/US13/40428, 13 pages.
Popenko, S. et al., "Driver to Hide Processes and Files", CodeProject, Aug. 17, 2009, 26 pgs.
Popenko et al., "Driver to Hide Processes and Files", all pages, Aug. 2009, found at.
Singapore Office Action dated Nov. 17, 2015 for Singapore patent application No. 11201408279Q, a counterpart foreign application of U.S. Appl. No. 13/538,439, 6 pages.
Singapore Office Action dated Sep. 28, 2015 for Singapore patent application No. 11201407292Q, a counterpart foreign application of U.S. Pat. No. 9,043,903, 6 pages.
European Office Action dated Feb. 19, 2020 for European Patent Application No. 13808592.3, a counterpart of U.S. Pat. No. 9,292,881, 4 pages.
Partial European Search Report dated Apr. 1, 2020 for European Patent Application No. 20150542.7, a counterpart of U.S. Pat. No. 9,043,903, 12 pages.
Non Final Office Action dated Mar. 2, 2020 for U.S. Appl. No. 16/007,507 "Security Agent", Diehl, 11 pages.
Non Final Office Action dated Dec. 30, 2019 for U.S. Appl. No. 15/857,007 "Kernel- and User-Level Cooperative Security Processing" Diehl, 10 pages.
Anonymous, "Connect(2)—Linux manual pages", Feb. 2017, retrieved from the internet: URL:https://web.archive.org/web/20170216051627/https://man7.org/linux/man-pages/man2/connect.2.html, 4 pages.
Anonymous, "Socket(2)—Linux manual page", Feb. 2017, retrieved from the internet: URL:https://web.archive.org/web/20170216095427/http://man7.org/linux/man-pages/man2/socket.2 html, 5 pages.
European Office Action dated Jun. 29, 2020 for European Patent Application No. 18157955.8, a counterpart foreign application of the U.S. Pat. No. 10,387,228, 10 pages.
Extended European Search Report dated Jun. 2, 2020 for European Patent Application No. 20172990.2, 8 pages.
Extended European Search Report dated Jul. 3, 2020 for European Patent Application No. 20150542.7, 12 pages.
European Office Action dated Jul. 21, 2021 for European Patent Application No. 20150542.7, a foreign counterpart to U.S. Pat. No. 9,043,903, 6 pages.
European Office Action dated Jan. 21, 2022 for European Patent Application No. 20172990.2, a foreign counterpart to U.S. Pat. No. 10,289,405, 5 pages.

\* cited by examiner

INTEGRITY ASSURANCE AND REBOOTLESS UPDATING DURING RUNTIME

CROSS REFERENCE TO RELATED APPLICATIONS

This patent application is a divisional of, and claims priority to U.S. Utility patent application, application Ser. No. 14/220,362, filed Mar. 20, 2014, which is fully incorporated herein by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

Many security software solutions, such as anti-virus software, have been developed to combat these security exploits. These security software solutions require maintenance, such as updates and patches, and to apply these updates and patches, the computing devices implementing the security software solutions must usually reboot. During the reboot, the security software solutions may not be active, providing an opportunity for security exploits to gain control of the computing devices. Even while the security software solutions are running, security exploits may subvert the security software solutions in any number of ways, such as killing or corrupting the security software solutions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for rebootless updating of a kernel-mode component, such as a security agent, of a computing device. An integrity manager associated with the kernel-mode component receives a request associated with an update to the kernel-mode component. In response, without rebooting the computing device, the integrity manager unloads at least a component of the kernel-mode component, such as a kernel-mode component executable, and loads an updated version of the component of the kernel-mode component. The integrity manager may store a state of a state manager of the kernel-mode component during the update and may initialize the updated kernel-mode component with the state of the state manager. Also, the integrity manager may register hooks with the operating system on behalf of the kernel-mode component, receive events associated with the hooks, log the events during the update, and deliver the logged events to the updated kernel-mode component. In some embodiments, rather than delivering the logged events, the integrity manager may act on them on its own when the integrity manager has sufficient knowledge of how to perform the correct action. Also, the integrity manager may register hooks at the lowest possible location on the system, or may use operating system-provided veto mechanisms, to force such a registry reads to occur or network packets to be sent, regardless of whether other components on the system, such as security software or malware, attempts to block the operation(s). In addition, the integrity manager may utilize operating-system provided veto mechanisms to force one or more actions. Further, the integrity manager may include a thread manager to spawn threads on behalf of the kernel-mode component and provide results of the threads to the kernel-mode component. By having the integrity manager spawn threads, the kernel-mode component need not wait for threads to return before proceeding with the update.

In various embodiments, the integrity manager may also determine the integrity of the kernel-mode component. Such determining may include determining that a known reaction did not occur responsive to an action by the kernel-mode component or the system, and performing either or both of a remediation action or notifying a remote security service. The integrity manager may further determine the integrity of a data store of the kernel-mode component. In response to determining that the data store has been compromised, the integrity manager may delete data from the data store or create a new data store.

Additionally, the integrity manager may hide the existence and operation of the kernel-mode component from other applications and processes of the computing device. To hide the existence and operation of the kernel-mode component, the integrity manager may determine whether any computing device lists include representations of components or connections associated with the kernel-mode component. The integrity manager may then remove the representations from the lists or remove the representations from responses to requests for contents of the computing device lists.

Example Environment

Figure 1:
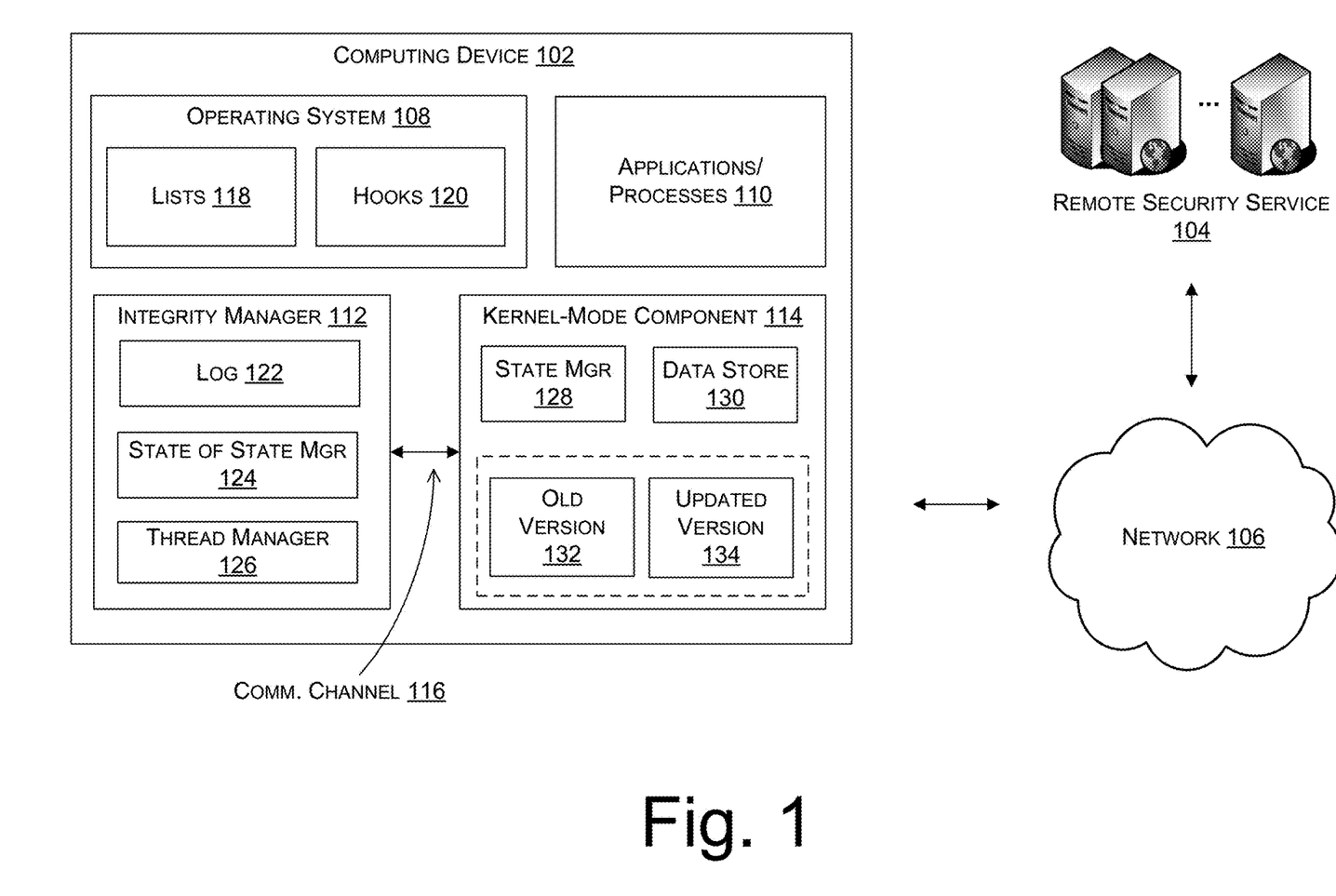
FIG. 1 illustrates an example environment in which an integrity manager associated with a kernel-mode component of a computing device ensures the integrity of the kernel-mode component during runtime and enables rebootless updating of the kernel-mode component.

FIG. 1 illustrates an example environment in which an integrity manager associated with a kernel-mode component of a computing device ensures the integrity of the kernel-mode component during runtime and enables rebootless updating of the kernel-mode component. As illustrated, a computing device 102 may be connected to a remote security service 104 via a network 106. The computing device may include an operating system 108, applications and processes 110, an integrity manager 112 associated with a kernel-mode component 114, and the kernel-mode component 114. The integrity manager 112 is connected to the kernel-mode component 114 by a communication channel 116. The operating system 108 may include computing device lists 118 that may be monitored and modified by the integrity manager 112, as well as hooks 120 that the integrity manager 112 may register with the operating system 108. The integrity manager 112 may include a log 122 to record events generated by the hooks 120, a state of a state manager 124, and a thread manager 126. The kernel-mode component 114 may include a state manager 128, the state of which is stored as the state of the state manager 124, and a data store 130. Additionally, the kernel-mode component 114 may include both an old version 132 of the kernel-mode component 114 and an updated version 134 that the kernel-mode component 114 will be updated to.

Figure 2:
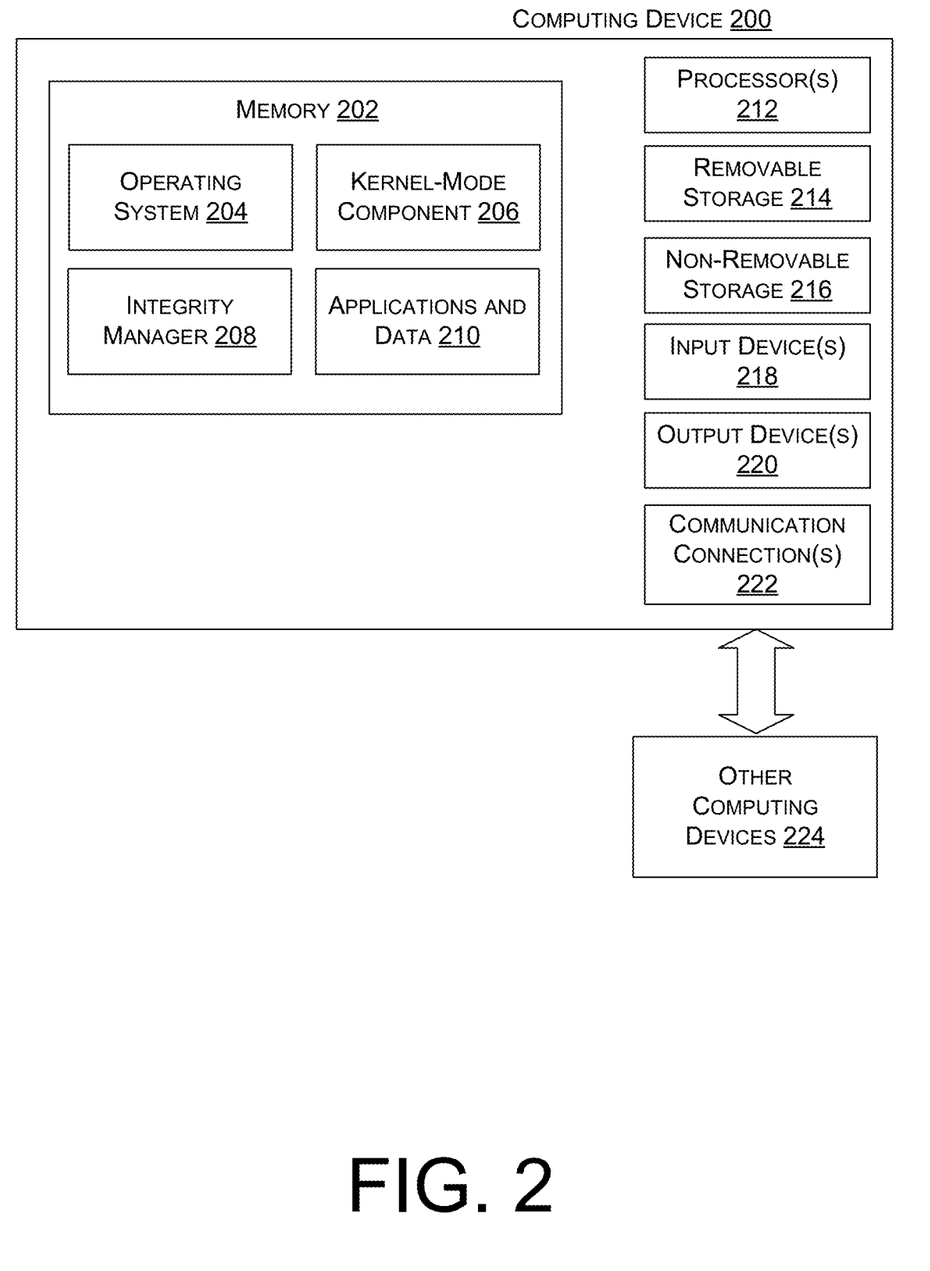
FIG. 2 illustrates a component level view of a computing device configured with a kernel-mode component and an integrity manager.

In various embodiments, the computing device 102 may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the computing device 102 may distribute the components and processes illustrated in FIG. 1 among the multiple computing devices. In some implementations, the computing device 102 represents one or more virtual machines implemented on one or more computing devices. An example computing device capable of serving as a computing device 102 is illustrated in FIG. 2 and described below with reference to that figure.

In some embodiments, the operating system 108 may be any sort of operating system, such as a Windows® operating system or a UNIX operating system. The operating system 108 may have load and unload functions for loading and unloading components. The load and unload functions may be invoked, for example, by the integrity manager 112 to unload at least a component of the kernel-mode component 114 and to load an updated version of the kernel-mode component 114. The operating system 108 also includes a number of computing device lists 118, such as a list of drivers, a list of network connections, a list of operating system hooks, a list of directories, or a list of registry keys. Applications and processes 110, integrity manager 112, and kernel-mode component 114 may request contents of these lists 118. Also, the operating system 108 may enable the integrity manager 112 to register a number of hooks. By registering hooks, the integrity manager 112 may be able to capture events occurring on the computing device 102.

In further embodiments, the applications and processes 110 may be any sort of applications and processes, including both benign and malicious programs. For example, applications and processes 110 may include a security exploit that deliberately monopolizes system resources, effectively causing a denial-of-service attack against the kernel-mode component 114. Such a security exploit could also or instead corrupt data of the kernel-mode component 114, such as the data store 130, or kill or misdirect the kernel-mode component 114. Additionally, even when an application or process 110 is not a security exploit, the application or process 110 may still have non-benign effects, such as over-utilizing system resources.

In various embodiments, the integrity manager may be a single component or may be a combination of components with the same title/job/behavior. The integrity manager 112 may ensure the integrity of the kernel-mode component 114 during the boot phase and runtime of the computing device 302. As described herein, the integrity manager 112 may ensure integrity during runtime through integrity checks of the kernel-mode component 114, through hiding the presence and operation of the kernel-mode component 114 from other applications and processes 110, and through managing the rebootless updating of the kernel-mode component 114.

In some embodiments, the integrity manager 112 may register hooks on behalf of the kernel-mode component 114 and relay events associated with those hooks 120 to the kernel-mode component 114 over the communication channel 116. The integrity manager 112 is utilized to register hooks 120 on behalf of the kernel-mode component 114 so that those hooks 120 are not lost during the rebootless updating of the kernel-mode component 114.

Additionally, the integrity manager 112 may register hooks at the lowest possible location on the system or may use operating-system provided veto mechanisms. It may do so to ensure that registry reads by the kernel-mode component 114 occur or network packets transmitted by the kernel-mode component 114 are sent, regardless of other processes, such as security vendors, attempting to block those operations. Also, by having the integrity manager 112 register the hooks 120, the integrity manager can log events by, for instance, logging the events in the log 122, while the kernel-mode component 114 is being updated and is unable to receive the events. When the kernel-mode component 114 is updated, the integrity manager 112 may then deliver the events logged in the log 122. Thus, the kernel-mode component 114 is able to obtain a complete record of events associated with hooks 120 by having the integrity manager 112 handle hook registration and event relaying on its behalf.

In further embodiments, the integrity manager 112 may maintain a state of the state manager 124. Such a state 124 may be a root state for the state manager 128. The state manager 128 may maintain handles, registry keys, memory allocations, or other non-persistent state information for the kernel-mode component 114. The state of the state manager 124 may be provided to the integrity manager 112 over the communication channel 116 periodically, or when the state manager 128 boots up, or as part of a rebootless update, prior to the unloading of the component of the kernel-mode component 114. Upon completion of a rebootless update, the integrity manager 112 provides the state of the state manager 124 to the state manager 128 of the kernel-mode component 114 to initialize the state manager 128 to the state of the state manager 124. In this way, non-persistent state, such as handles to registry keys and files, existing calculations on gathered data, and memory allocations, are not lost during the rebootless update.

In some embodiments, the integrity manager 112 may include a thread manager 126 to initiate threads on behalf of the kernel-mode component 114. For example, the thread manager 126 may receive a request to initiate a thread to calculate a cryptographic hash of a file from the kernel-mode component 114, via the communication channel 116. The thread manager 126 may then initiate the thread and, upon completion of the thread, provide a result of the thread's execution to the kernel-mode component 114 over the communication channel 116. By having the integrity manager 112, rather than the kernel-mode component 114, handle management of threads for the kernel-mode component 114, the kernel-mode component 114 need not wait for a thread to return before beginning a rebootless update. If a thread returns while the kernel-mode component 114 is being updated, the thread returns to the thread manager 126, which may maintain the result of the thread execution during the update and may provide it to the kernel-mode component 114 at the completion of the update.

The integrity manager 112 may also be responsible for registering notification callbacks and/or completion routines that are associated with various input/output operations which a kernel-mode component 114 can initiate or with other system changes (e.g., changes that a kernel-mode component 114 may seek to be notified about). Because such completion routines or notification callbacks may be called at any time by the operating system 108, it may not be possible to synchronize such callbacks with the unloading of a kernel-mode component 114. As such, it could be possible for a kernel-mode component 114 to have been unloaded, but for an I/O completion notification to still be delivered to what is now a stale (unloaded) address, causing a system crash. In order to avoid this issue, the integrity manager 112 takes on the responsibility of registering such completion routines and notification callbacks such that the operating system 108 is enabled to safely deliver code that is resident in memory. The integrity manager 112, if it determines that the kernel-mode component 114 is still active and safely accessible (or through a publisher/subscriber model), then notifies the kernel-mode component 114 of such notifications of completions. If the kernel-mode component 114 is not present, the integrity manager 112 may simply ignore the notification or completion.

In various embodiments, a rebootless update of the kernel-mode component 114 may be responsive to the kernel-mode component 114 receiving an update to a component of the kernel-mode component 114, such as the kernel-mode component executable. Once the kernel-mode component 114 has received the update, the kernel-mode component 114 may request, over the communication channel 116, that the integrity manager 112 manage the rebootless update. Upon receiving the request to manage the rebootless update, the integrity manager 112 may, in some embodiments, retrieve a state of the state manager 124 from the state manager 128. In other embodiments, the integrity manager 112 may be in possession of the state 124. The integrity manager 112 may then unload the component of the kernel-mode component 114, which may involve requesting that the operating system 108 unload the component of the kernel-mode component 114. Upon receiving confirmation of the unload, the integrity manager 112 may initiate the loading of the updated version 134 of component of the kernel-mode component 114. This may involve invoking an operating system load function of the operating system 108 to load the updated version 108. After the unloading and prior to the loading, if the integrity manager 112 receives events associated with the hooks 120, the integrity manager 112 logs the events in the log 122.

After the loading, the integrity manager 112 may determine whether the kernel-mode component 114 has been successfully updated. If the update was not successful, the integrity manager 112 may unload the updated version 134 and reload the old version 132 that was replaced by the updated version.

Once the load has been successfully completed, the integrity manager 112 may provide the state of the state manager 124 to the state manager 128 to initialize the state manager 128 and may deliver events stored in the log 122.

In further embodiments, the integrity manager 112 may receive an update to the integrity manager 112 from the remote security service 104. Upon receiving such an update, the integrity manager 112 may initiate an update process, which may involve a reboot of the computing device 102.

In various embodiments, the integrity manager 112 may perform any of a number of integrity checks to insure the integrity of the kernel-mode component 114 during runtime. These integrity checks may include causing the kernel-mode component 114 to perform an action (e.g., generate an event, such as writing a registry key) with a known reaction (e.g., event generated and processed). Alternatively or additionally, the integrity checks may include detecting whether a system action associated with a known reaction has occurred. The integrity manager 112 then determines whether the known reaction occurred (e.g., determining whether the event was generated and determining whether the event was processed). If the integrity manager 112 determines that the known reaction did not occur, the integrity manager 112 may perform a remediation action or notify the remote security service 104. In some embodiments, such a notification to the remote security service 104 may be via a communication module of the integrity manager 112, as the communication module of the kernel-mode component 114 may be compromised. These integrity checks may be performed on a periodic basis or may be triggered by events. For example, the integrity manager 112 may determine that there is no activity on the part of the kernel-mode component 114 and may, in response, perform one or more integrity checks.

In some embodiments, a given action may be associated with multiple known reactions, and different remedies or notifications may be applied by the integrity manager 112 depending on the differing reactions. For example, known reactions may include generation of an event and processing of the event. If the event is generated but not processed, the integrity manager 112 may perform a first remediation action or send a first notification. For instance, the event may not have been processed because of over-utilization of resources. In response, the integrity manager 112 may generate a new worker thread, flush an event queue, or reset the kernel-mode component 114. The integrity manager 112 may then repeat the integrity check to determine whether the event is now processed. Alternatively, the integrity manager 112 may simply reload the kernel-mode component 114 and repeat the integrity check. If, on the other hand, the event is not even generated, the integrity manager 112 may perform a second remediation action or send a second notification. For instance, the integrity manager 112 could register a new operating system hook 120 and repeat the integrity check to determine whether the new hook 120 captures the event.

Another example of an integrity check is validating the signature of the kernel-mode component 114. Some operating systems, such as the UNIX and Macintosh (or, popularly, "Mac") operating systems, do not perform digital signature validation, and other operating systems, such as the Windows family of operating systems, only perform digital signature validation on their 64-bit variants. Even operating systems which perform digital signature validation only validate that a valid company has signed the binaries, not that a security service or the manufacturer has signed them. The integrity manager 112 validates the signature of the components it manages (including its own) and compares the public key used in the digital signature with the expected public key of the manufacturer. If no key is present at all, or if the wrong key is present, the integrity manager 112 may take appropriate measures (e.g., remediation, notification, etc.).

In further embodiments, the integrity checks may include determining whether a data store 130 of the kernel-mode component 114 is compromised. The data store 130 (e.g., a situational model) may track attributes, patterns, and behaviors of applications and processes 110. If the integrity manager 112 determines that the data store 130 is compromised, the integrity manager 112 may either delete data from the data store 130 or create a new data store 130 and initialize the new data store 130 based on the previous data store 130. By taking one of these remedial actions, the integrity manager 112 enables the data store 130 to continue tracking track attributes, patterns, and behaviors of applications and processes 110.

In various embodiments, the integrity manager 112 may ensure the integrity of the kernel-mode component 114 during runtime by hiding the existence or operation of the kernel-mode component 114 from other applications and processes 110. The integrity manager 112 may check the lists 118 to determine whether any of the lists include a representation of a component or connection associated with the kernel-mode component 114. Such a component may, for example, be a driver, an operating system hook, a directory, or a registry key. If a list 118 includes such a representation, the integrity manager 112 may either remove the representation from the list 118 or intercept responses to requests for contents of the list 118 to remove the representation from the response. Removing the representation from the response rather than the list 118 may be appropriate when removal from the list 118 would hinder operation of the kernel-mode component 114. The integrity manager 112 may also intercept requests to open or access a representation in a list 118 (e.g. a request to open a directory for the kernel-mode component 114 in a list 118 of directories). The integrity manager 112 may then respond to the intercepted request and state that the representation (e.g., the directory) does not exist.

The kernel-mode component 114, which may be a security agent, may monitor and record activity on the computing device 102, may analyze the activity, and may generate alerts and events and provide those alerts and events to the remote security service 104. The kernel-mode component 114 may be installed by and configurable by the remote security service 104, receiving, and applying while live, reconfigurations of the kernel-mode component 114. The kernel-mode component 114 may handle live application of updates of a number of kernel-mode component components. Updating of the kernel-mode component executable may be performed by the integrity manager 112, in the manner described above. An example kernel-mode component 114 is described in greater detail in U.S. patent application Ser. No. 13/492,672, entitled "Kernel-Level Security Agent" and filed on Jun. 8, 2012.

The state manager 128, data store 130, old version 132 of the kernel-mode component 114, and new version 134 of the kernel-mode component 114 are described above in greater detail.

In various embodiments, the devices implementing the remote security service 104 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the devices implementing the remote security service 104 represent a plurality of computing devices working in communication, such as a cloud computing network of nodes. In some implementations, one or more of the devices implementing the remote security service 104 represent one or more virtual machines implemented on one or more computing devices.

In some embodiments, the remote security service 104 may be a provider of information security services to individual users and client entities, such as maintenance, updating, and configuration of the kernel-mode component 114 and integrity manager 112, threat modeling, and/or remediation. The remote security service 104 may receive alert notifications and security events, either from the kernel-mode component 114 or from the integrity manager 112 via its communication module. In response, the remote security service 104 may update a configuration for either or both of the kernel-mode component 114 or the integrity manager 112, may provide instructions to the kernel-mode component 114 or the integrity manager 112, or may take some healing or remediation action.

In various embodiments, the network 106 may include any one or more networks, such as wired networks, wireless networks, and combinations of wired and wireless networks. Further, the network 106 may include any one or combination of multiple different types of public or private networks (e.g., cable networks, the Internet, wireless networks, etc.). In some instances, computing devices communicate over the network 106 using a secure protocol (e.g., https) and/or any other protocol or set of protocols, such as the transmission control protocol/Internet protocol (TCP/IP).

Example System

FIG. 2 illustrates a component level view of a computing device configured with a kernel-mode component and an integrity manager. As illustrated, computing device 200 comprises a memory 202 storing an operating system 204, a kernel-mode component 206, an integrity manager 208, and applications and data 210. Also, computing device 200 includes processor(s) 212, a removable storage 214 and non-removable storage 216, input device(s) 218, output device(s) 220 and communication connections 222 for communicating with other computing devices 224.

In various embodiments, memory 202 is volatile (such as RAM), non-volatile (such as ROM, flash memory, etc.) or some combination of the two. The operating system 204 may be any sort of operating system, such as the operating system described above in detail with respect to FIG. 1. The kernel-mode component 206 and integrity manager 208 are described above in detail with respect to FIG. 1. The applications and data 210 may be any sort of applications and data, such as the applications and data described above in detail with respect to FIG. 1.

In some embodiments, the processor(s) 212 is a central processing unit (CPU), a graphics processing unit (GPU), or both CPU and GPU, or other processing unit or component known in the art.

Computing device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media may include volatile and nonvolatile, removable and non-removable media implemented in any method or technology for storage of information, such as computer readable instructions, data structures, program modules, or other data. Memory 202, removable storage 214 and non-removable storage 216 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 200. Any such tangible computer-readable media may be part of the computing device 200.

Computing device 200 also has input device(s) 218, such as a keyboard, a mouse, a touch-sensitive display, voice input device, etc., and output device(s) 220 such as a display, speakers, a printer, etc. These devices are well known in the art and need not be discussed at length here.

Computing device 200 also contains communication connections 222 that allow the computing device 200 to communicate with other computing devices 224, such as device(s) the remote security service 104.

Example Processes

Figure 3:
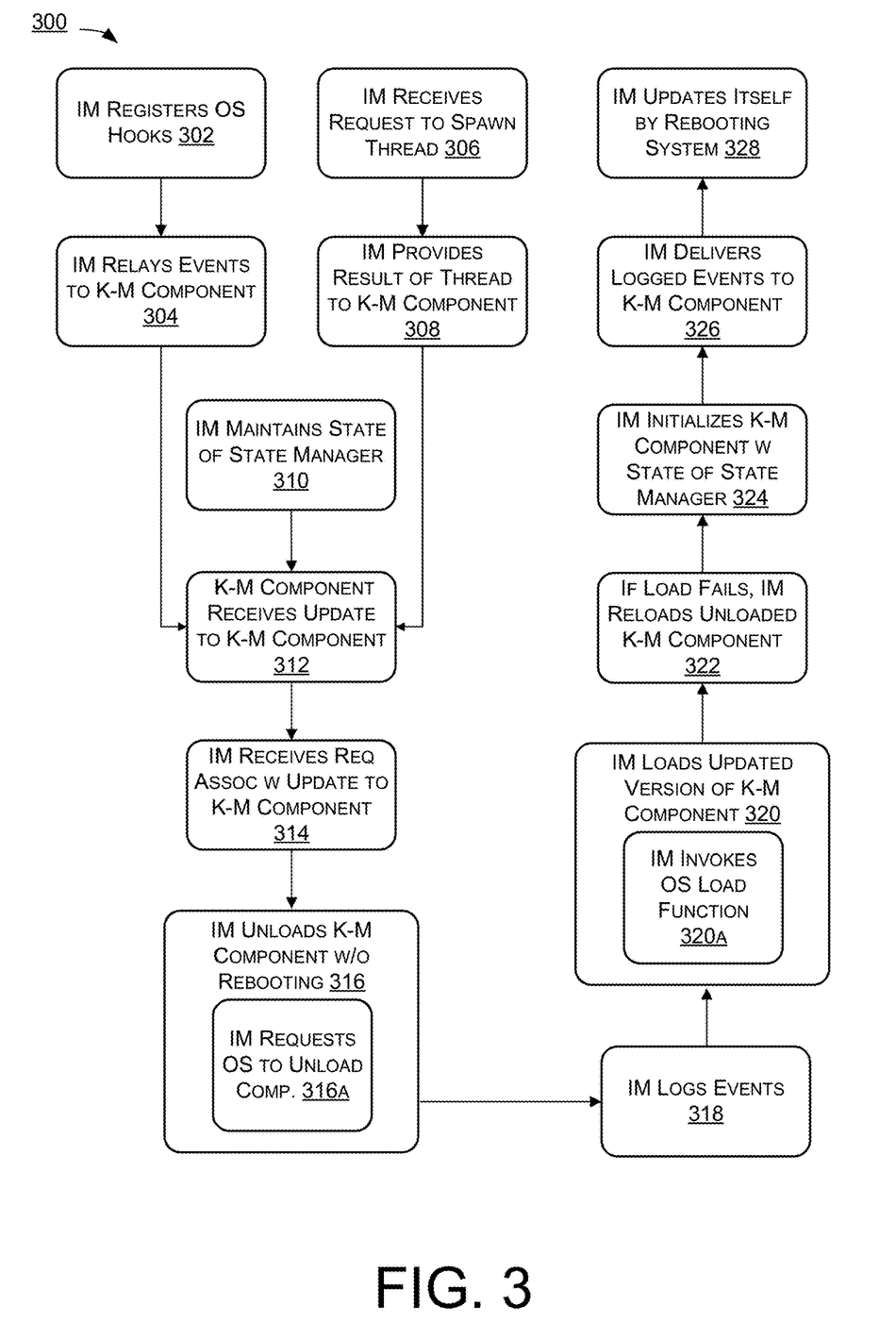
FIG. 3 illustrates an example process for receiving, by an integrity manager, a request associated with an update of a kernel-mode component and for, without rebooting, unloading the kernel-mode component and loading an updated version of the kernel-mode component.
Figure 4:
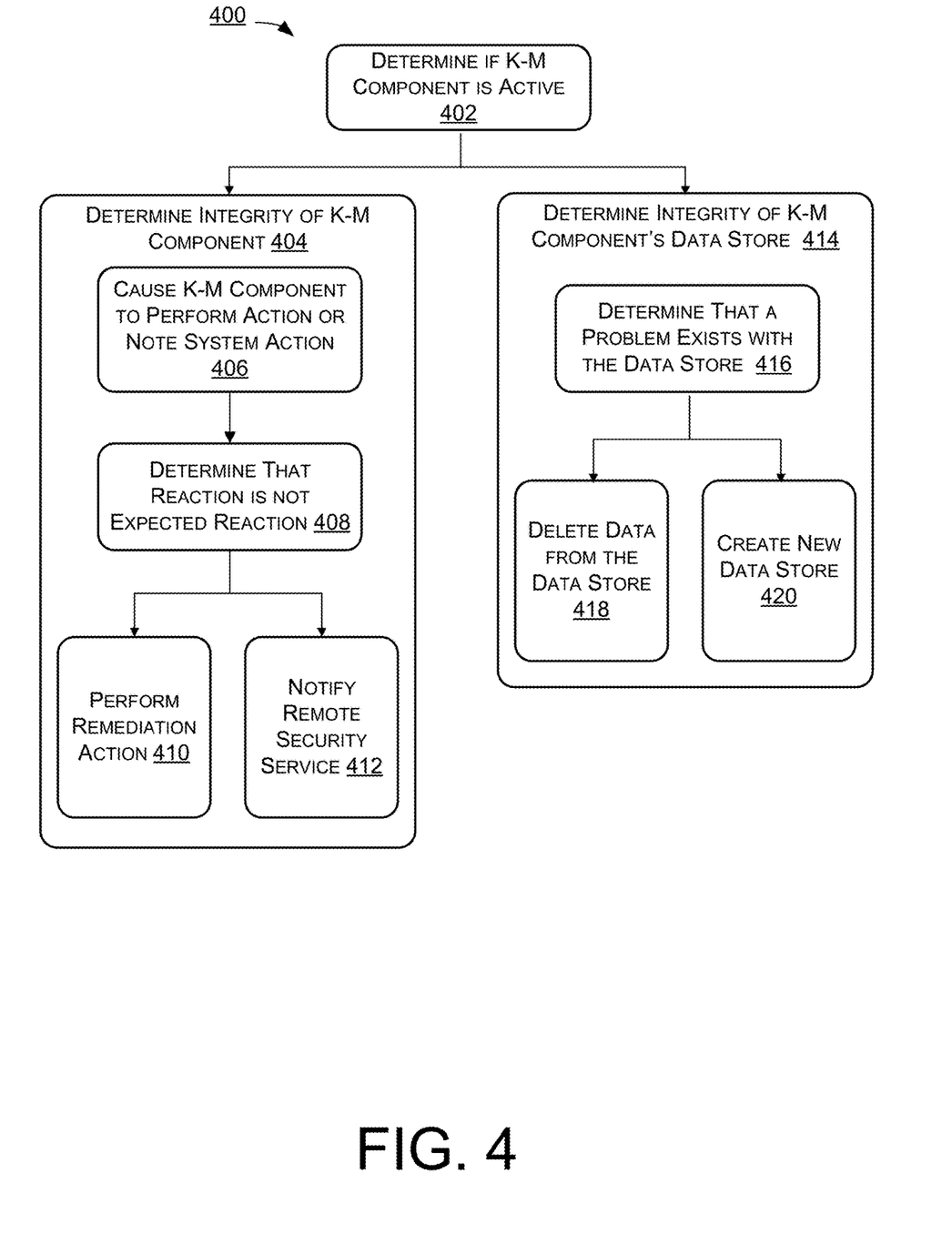
FIG. 4 illustrates an example process for determining integrity of a kernel-mode component by determining whether a known reaction to an action of the kernel-mode component or the system occurred, and, if it did not occur, performing a remediation action or notifying a remote security service.
Figure 5:
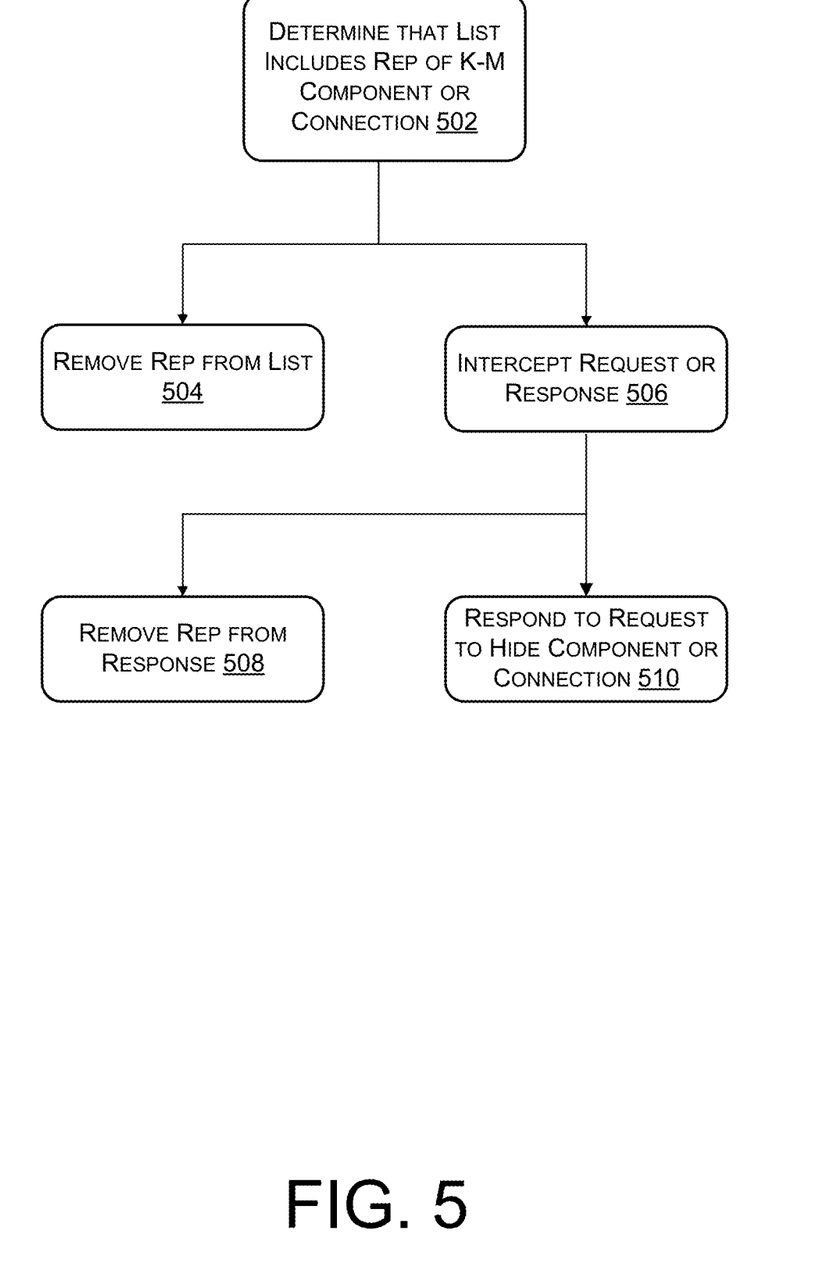
FIG. 5 illustrates an example process for determining that a computing device list includes a representation of a component or a connection associated with a kernel-mode component and either removing the representation from the list or removing the representation from a response to a request for contents of the list.

FIGS. 3-5 illustrate example processes 300, 400, and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for receiving, by an integrity manager, a request associated with an update of a kernel-mode component and for, without rebooting, unloading the kernel-mode component and loading an updated version of the kernel-mode component. The process 300 includes, at 302, registering, by an integrity manager that is associated with a kernel-mode component of a computing device, operating system hooks on behalf of the kernel-mode component. At 304, the integrity manager then relays events associated with the operating system hooks to the kernel-mode component.

In addition to or in alternative to the operations shown at 302-304, the integrity manager, at 306, receives a request to spawn a thread on behalf of the kernel-mode component and, at 308, provides a result of the thread to the kernel-mode component.

In addition or in alternative to either or both of the operations shown at 302-304 or 306-308, the integrity manager, at 310, maintains a state of a state manager of the kernel-mode component. The state manager maintains handles to registry keys and files, and memory allocations for the kernel-mode component.

At 312, the kernel-mode component receives an update of at least one component of the kernel-mode component, such as an updated kernel-mode component executable. The kernel-mode component then requests that the integrity manager mage a rebootless update of the kernel-mode component and the integrity manager, at 314, receives the request. At 316, the integrity manager then unloads at least a component of the kernel-mode component without rebooting the computing device. At 316a, the unloading includes requesting that the operating system of the computing device unload the component of the kernel-mode component (e.g., the kernel-mode component executable). At 318, while the component of the kernel-mode component is unloaded, the integrity manager logs events associated with the operating system hooks registered at 302. At 320, the integrity manager loads the updated version of the component of the kernel-mode component, which may be or include the update received by the kernel-mode component at 312. At 320a, the loading may include invoking an operating system load function to load the updated version of the kernel-mode component. At 322, if the load fails, the integrity manager reloads the unloaded version of the component of the kernel-mode component.

At 324, the integrity manager then initializes the updated kernel-mode component with the state of the state manager.

At 326, the integrity manager delivers the events logged while the kernel-mode component was unloaded to the updated kernel-mode component.

At 328, the integrity manager determines that the integrity manager is to be updated and reboots the computing device.

FIG. 4 illustrates an example process for determining integrity of a kernel-mode component by determining whether a known reaction occurred responsive to an action by the agent or the system, and, if it did not occur, performing a remediation action or notifying a remote security service. The process 400 includes, at 402, determining, by an integrity manager associated with a kernel-mode component of a computing device, whether the kernel-mode component is inactive.

At 404, in response to determining that the kernel-mode component is inactive, or without any such determination, the integrity manager determines the integrity of the kernel-mode component. This determining includes, at 406, causing the kernel-mode component to perform an action that is associated with a known reaction or detecting that a system action associated with a known reaction occurred. At 408, the integrity manager determines whether the known reaction occurred. If the known reaction did not occur, then the integrity manager performs either or both of, at 410, a remediation action or, at 412, notifying a remote security service.

In some embodiments, the action includes generating an event and the known reaction includes generation of the event and processing of the event. The integrity manager then performs, at 410, a first remediation action or sends, at 412, a first notification to the remote security service in response to determining, at 408, that the event was generated but not processed. The integrity manager performs, at 410, a second remediation action or sends, at 412, a second notification to the remote security service in response to determining, at 408, that the event was not generated. Also or instead, the integrity manager may determine, at 408, that the event was generated but not processed and, in response, perform, at 410, the remediation action, the remediation action including generating a new worker thread, flushing an event queue, or resetting the kernel-mode component.

At 414, the integrity manager determines the integrity of a data store of the kernel-mode component. This determining includes, at 416, determining whether the integrity of the data store has been compromised and if it has, performing either or both of, at 418, deleting data from the data store or, at 420, saving state of the data store, creating a new data store, and initializing the new data store to the saved state.

FIG. 5 illustrates an example process for determining that a computing device list includes a representation of a component or a connection associated with a kernel-mode component and either removing the representation from the list or removing the representation from a response to a request for contents of the list. The process 500 includes, at 502, determining, by an integrity manager associated with a kernel-mode component of a computing device, that a computing device list includes a representation of a component or a connection associated with a kernel-mode component of the computing device. The component may be a driver, an operating system hook, a directory, or a registry key, and the computing device list may be a list of drivers, a list of network connections, a list of operating system hooks, a list of directories, or a list of registry keys.

At 504, the integrity manager removes the representation of the component or the connection from the computing device list.

Alternatively to the removing at 504, the integrity manager, at 506, intercepts a response to a request for contents of the computing device list and, at 508, removes the representation of the component or the connection from the response.

Alternatively to the removing at 504 and to the response interception at 506, the integrity manager, at 506, intercepts a request to open a directory associated with the kernel-mode component and, at 510, responds that the directory does not exist or is not available.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
a processor; and
memory storing:
a kernel-mode component of a security agent, the kernel-mode component being configured to be operated by the processor to:
monitor events that occur on the computing device; and
provide information associated with the events to a remote security service; and
an integrity manager associated with the kernel-mode component, the integrity manager being configured to be operated by the processor to:
register an operating system hook on behalf of the kernel-mode component;
receive, via the operating system hook, the events that occur on the computing device;
provide the events to the kernel-mode component for processing; and
determine an integrity of the kernel-mode component by:
causing the kernel-mode component to perform an action associated with generation of an event on the computing device, wherein the integrity manager is configured to capture the event via the operating system hook;
determining that the event was not generated, or was not processed, in response to the action of the kernel-mode component; and
in response to determining that the event was not generated, or was not processed, performing at least one of a remediation action or notifying the remote security service associated with the kernel-mode component.

2. The computing device of claim 1, wherein the integrity manager is further configured to:
determine that the kernel-mode component is inactive; and
perform the determining of the integrity of the kernel-mode component responsive to determining that the kernel-mode component is inactive.

3. The computing device of claim 1, wherein the integrity manager is configured to:
perform a first remediation action or send a first notification to the remote security service in response to determining that the event was generated but was not processed, and
perform a second remediation action or send a second notification to the remote security service in response to determining that the event was not generated.

4. The computing device of claim 1, wherein the remediation action includes one of:
generating a new worker thread,
flushing an event queue,
registering a new operating system hook, or
resetting or reloading the kernel-mode component without rebooting the computing device.

5. The computing device of claim 1, wherein the integrity manager is further configured to:
determine that an integrity of a data store associated with the kernel-mode component has been compromised; and
in response to determining that the integrity of the data store has been compromised, perform at least one of:
deleting data from the data store, or
saving a saved state of the data store, creating a new data store, and initializing the new data store based on the saved state.

6. The computing device of claim 1, wherein the integrity manager is further configured to determine the integrity of the kernel-mode component by:
detecting an occurrence of a system action on the computing device, wherein the system action is associated with generation of a second event;
determining that the second event was not generated, or was not processed, in response to the occurrence of the system action; and
in response to determining that the second event was not generated, or was not processed, performing at least one of the remediation action or the notifying the remote security service.

7. The computing device of claim 5, wherein the data store is a situational model that tracks at least one of attributes, patterns, or behaviors associated with applications or processes executing on the computing device.

8. The computing device of claim 1, wherein the event is associated with the kernel-mode component writing a registry key.

9. A computer-implemented method comprising:
registering, by an integrity manager associated with a kernel-mode component of a security agent executing on a computing device, an operating system hook on behalf of the kernel-mode component, wherein registering the operating system hook causes the integrity manager to:
  receive, via the operating system hook, events that occur on the computing device; and
  provide the events to the kernel-mode component for processing;
determining, by the integrity manager, an integrity of the kernel-mode component by:
  causing the kernel-mode component to perform an action associated with generation of an event on the computing device, wherein the integrity manager is configured to capture the event via the operating system hook;
  determining that the event was not generated, or was not processed, in response to the action of the kernel-mode component; and
  in response to determining that the event was not generated, or was not processed, performing at least one of a remediation action or notifying a remote security service associated with the kernel-mode component,
wherein the kernel-mode component of the security agent is configured to:
  monitor the events that occur on the computing device, and
  provide information associated with the events to the remote security service.

10. The computer-implemented method of claim 9, further comprising:
  determining, by the integrity manager, that the kernel-mode component is inactive,
  wherein the integrity manager determines the integrity of the kernel-mode component responsive to determining that the kernel-mode component is inactive.

11. The computer-implemented method of claim 9, wherein the remediation action includes one of:
  generating a new worker thread,
  flushing an event queue,
  registering a new operating system hook, or
  resetting or reloading the kernel-mode component without rebooting the computing device.

12. The computer-implemented method of claim 9, further comprising:
  determining, by the integrity manager, that an integrity of a data store associated with the kernel-mode component has been compromised; and
  in response to determining that the integrity of the data store has been compromised, performing, by the integrity manager, at least one of:
    deleting data from the data store, or
    saving a saved state of the data store, creating a new data store, and initializing the new data store based on the saved state.

13. The computer-implemented method of claim 9, wherein performing the at least one of the remediation action or notifying the remote security service comprises:
  performing a first remediation action or sending a first notification to the remote security service in response to determining that the event was generated but was not processed, and
  performing a second remediation action or sending a second notification to the remote security service in response to determining that the event was not generated.

14. The computer-implemented method of claim 9, further comprising:
  detecting an occurrence of a system action on the computing device, wherein the system action is associated with generation of a second event;
  determining that the second event was not generated, or was not processed, in response to the occurrence of the system action; and
  in response to determining that the second event was not generated, or was not processed, performing at least one of the remediation action or the notifying the remote security service.

15. One or more non-transitory computer-readable media storing computer-executable instructions that, when executed by one or more processors of a computing device, cause the one or more processors to perform operations comprising:
  registering, by an integrity manager associated with a kernel-mode component of a security agent executing on the computing device, an operating system hook on behalf of the kernel-mode component, wherein registering the operating system hook causes the integrity manager to:
    receive, via the operating system hook, events that occur on the computing device; and
    provide the events to the kernel-mode component for processing;
  determining, by the integrity manager, an integrity of the kernel-mode component by:
    causing the kernel-mode component to perform an action associated with generation of an event on the computing device, wherein the integrity manager is configured to capture the event via the operating system hook;
    determining that the event was not generated, or was not processed, in response to the action of the kernel-mode component; and
    in response to determining that the event was not generated, or was not processed, performing at least one of a remediation action or notifying a remote security service associated with the kernel-mode component,
  wherein the kernel-mode component of the security agent is configured to:
    monitor the events that occur on the computing device, and
    provide information associated with the events to the remote security service.

16. The one or more non-transitory computer-readable media of claim 15, wherein the operations further comprise:
  determining, by the integrity manager, that the kernel-mode component is inactive,
  wherein the integrity manager determines the integrity of the kernel-mode component responsive to determining that the kernel-mode component is inactive.

17. The one or more non-transitory computer-readable media of claim 15, wherein the computer-executable instructions cause the integrity manager to:
  perform a first remediation action or send a first notification to the remote security service in response to determining that the event was generated but was not processed, and perform a second remediation action or send a second notification to the remote security service in response to determining that the event was not generated.

18. The one or more non-transitory computer-readable media of claim 15, wherein the operations further comprise:

determining, by the integrity manager, that an integrity of a data store associated with the kernel-mode component has been compromised; and in response to determining that the integrity of the data store has been compromised, performing at least one of:

deleting, by the integrity manager, data from the data store, or saving, by the integrity manager, a saved state of the data store, creating, by the integrity manager, a new data store, and initializing, by the integrity manager, the new data store based on the saved state.

19. The one or more non-transitory computer-readable media of claim 15, wherein the remediation action includes one of:

generating a new worker thread,
flushing an event queue,
registering a new operating system hook, or
resetting or reloading the kernel-mode component without rebooting the computing device.

20. The one or more non-transitory computer-readable media of claim 15, wherein the operations further comprise:

detecting an occurrence of a system action on the computing device, wherein the system action is associated with generation of a second event;

determining that the second event was not generated, or was not processed, in response to the occurrence of the system action; and in response to determining that the second event was not generated, or was not processed, performing at least one of the remediation action or the notifying the remote security service.

* * * * *